United States Patent Office 2,919,220
Patented Dec. 29, 1959

2,919,220

THERMOSETTING COMPOSITION CONTAINING A LIQUID POLYMER OF A DIENE AND AN ESTER, PROCESS FOR MAKING SAME AND ARTICLES THEREOF

Charles E. Wheelock, Bartlesville, Okla., assignor to Phillips Petroleum Company, a corporation of Delaware Application June 20, 1955, Serial No. 516,408

15 Claims. (Cl. 154—140)

This invention relates to a thermosetting resin and method of making same. In one of its aspects, this invention relates to a thermosetting resin of exceptionally high flexural strength. In still another aspect, this invention relates to a new composition of matter resulting from curing a blend of a liquid polymer of a conjugated diene and an ester of an acid of the group acrylic, methacrylic, and cyanuric acids.

With the rapid growth of the plastic molding industry, there is a constant search for new and improved resins. It is known to prepare thermosetting resins using liquid polybutadiene and certain copolymerizable monomers, such as styrene, for example. Such resins are useful in the production of molding compositions and molded objects, as coating compositions for use in finishes for wood, metals, plastics, etc., and as the binder in the preparation of laminates. However, the flexural strengths of these resins are frequently not sufficiently high to make them economically attractive for many applications and the cure time of such resins is frequently unduly long. However, the increased demand and use of such resins calls for more and stronger bonding resins and having more favorable cure times.

An object of this invention is to provide new polymerizable and polymerized compositions.

It is another object of this invention to provide a novel coating resin of high flexural strength.

It is still another object of this invention to provide a laminate having high flexural strength.

Other objects and advantages of this invention will be apparent upon reading this disclosure and the attached claims.

According to this invention, a liquid polymer of a conjugated diene is admixed with an ester of an acid selected from the group consisting of acrylic, methacrylic, and cyanuric acids to form a new composition of matter which can be cured by heat.

I have found that hard, tough resins are produced by blending a liquid polymer of a conjugated diene with certain esters of acrylic, methacrylic, and cyanuric acids and heating the blends at temperatures generally in the range between 150 and 280° C. (302 to 536° F.) for a period which will generally be in the range between 2 and 50 hours. These new compositions cure much more rapidly than does the liquid polymer alone which requires long exposure to high temperatures to produce resins with the desired degree of hardness. They are valuable for the production of castings and laminates and require a shorter cure time to reach optimum strength than do the liquid polymers. When employed in the production of laminates, e.g., Fiberglas cloth laminates, the flexural strength and bonding strength are higher and the retention of strength on exposure to high temperatures is greater than is found in similar laminates prepared with liquid polymer alone.

The liquid polymer, in general, has an average molecular weight within the range of 300 to 3,000, and a viscosity generally in the range of 100 to 6,000 Saybolt Furol seconds, as measured at 100° F. The liquid polymer can be a polymer of the conjugated diene alone, or a polymer of the conjugated diene with a minor proportion of one or more monoolefins copolymerizable therewith and containing the group $CH_2=C<$, such as styrene, methyl substituted styrenes, and the like. Preferably, the monomer being polymerized will comprise at least 70 weight percent of such monomer system.

The liquid polymer employed in the process of my invention can be produced from a conjugated diene, a mixture of conjugated dienes, or a mixture comprising a conjugated diene along with other copolymerizable monomers. The liquid polymer is preferably prepared by mass polymerization in the presence of a finely divided alkali metal catalyst. However, liquid polymers prepared by other methods such as aqueous emulsion polymerization in the presence of relatively large amounts of modifiers such as mercaptans, and those liquid polymers produced in the presence of hydrofluoric acid as a catalyst are also applicable in this invention.

When employing emulsion polymerization, a sufficiently large amount of modifier is utilized, such as 3 to 10 parts by weight of an alkyl mercaptan per 100 parts of monomers to provide liquid polymers having the characteristics discussed above.

One method of preparing the preferred liquid polymer by solution polymerization is disclosed in U.S. Patent 2,631,175, issued March 10, 1953, to Willie W. Crouch. In the procedure referred to in that patent, a conjugated diene of about 98 percent purity or higher is polymerized alone, or together with a minor proportion of a monomer copolymerizable therewith, and containing the group $CH_2=C<$, such as styrene, methyl substituted styrene, and the like, in the presence of a finely divided alkali metal catalyst and a suitable diluent, under carefully controlled reaction conditions, particularly temperature, catalyst concentration, quantity of solvent and rate of conjugated diene addition. In the preparation of a copolymer, the major polymerizable ingredient is a conjugated diene and such conjugated dienes are present in an amount which exceeds 50 weight percent of the monomeric materials and will preferably be present in an amount of at least 70 weight percent. The polymer thus produced is a substantially colorless transparent liquid which is free from dissolved or suspended solid polymers. The viscosity of the liquid polymer for a given concentration of catalyst is, in a large part, proportional to the selected particle size of the catalyst, being generally within the limits of from 100 to 6,000, and often from 100 to 2,000 Saybolt Furol seconds, as measured at 100° F. Reaction temperatures employed are generally within the limits of 60 to 110° C. The time required to carry out the polymerization, exclusive of the initial induction period, does not generally exceed 8 hours, and is generally below 4 hours.

When employing hydrofluoric acid as a catalyst, a liquid polymer can be prepared by mass polymerization, conducted in an inert solvent, at a temperature within the limits of about —110° to 20° F. This method is discussed in detail in U.S. Patent 2,550,695, issued May 1, 1951, on an application of J. C. Hillyer and J. F. Wilson.

I find that in the production of improved resin compositions of my invention, those having the most desirable characteristics are formed when employing a liquid polymer having a viscosity and molecular weight within the ranges above described. The liquid polymer generally used and preferred is a homopolymer of 1,3-butadiene, however, polymers of the conjugated dienes, such as 2,3-dimethyl-1,3-butadiene, isoprene, piperylene, and the like, can be used. Furthermore, copolymers of one or more of such conjugated dienes with copolymerizable monomers, such as styrene, various alkyl substituted styrenes, and the like, are applicable. The liquid polymer can be further processed, such as by gas stripping or by extraction, if so desired.

Esters which are blended with the liquid polymers are alkyl and alkenyl esters of acrylic and methacrylic acids and alkenyl esters of cyanuric acid. Esters of acrylic and methacrylic acid may be represented by the formula

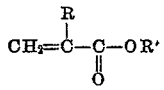

where R is hydrogen or a methyl radical and R' is either an alkyl group containing not more than 5 carbon atoms or an alkenyl group containing between 2 and 10 carbon atoms. Esters of cyanuric acid may be represented by the formula

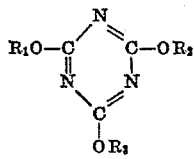

where $R_1$ is an alkenyl radical containing from 2 to 10 carbon atoms and $R_2$ and $R_3$ can be alkyl and/or alkenyl radicals. Where $R_2$ or $R_3$ are alkyl radicals, they will contain not more than 5 carbon atoms each and if they are alkenyl, they can contain between 2 and 10 carbon atoms each. The esters of cyanuric acid which are most frequently preferred are those containing either two or three alkenyl groups.

Esters which are applicable include methyl acrylate, ethyl acrylate, propyl acrylate, isopropyl acrylate, n-butyl acrylate, tert-butyl acrylate, amyl acrylate, vinyl acrylate, allyl acrylate, methallyl acrylate, ethallyl acrylate, propallyl acrylate, 2-butenyl acrylate, 3-butenyl acrylate, 3-methyl-2-butenyl acrylate, 3-methyl-3-butenyl acrylate, 2-pentenyl acrylate, 3-pentenyl acrylate, 4-pentenyl acrylate, 2-hexenyl acrylate, 2-octenyl acrylate, 3-nonenyl acrylate, 2-decenyl acrylate, the corresponding methacrylates, trivinyl cyanurate, methyl divinyl cyanurate, triallyl cyanurate, trimethyallyl cyanurate, diallyl methallyl cyanurate, methyl diallyl cyanurate, diethyl methallyl cyanurate, methyl di(2-octenyl) cyanurate, dimethyl 2-decenyl cyanurate, tri-(2-butenyl) cyanurate, etc.

The amount of the ester component used in the liquid polymer-ester compositions is generally in the range between 1 and 70 parts by weight, preferably in the range between 10 and 40 parts by weight, per 100 parts of the blend.

The blended compositions, prior to curing, range from quite fluid to viscous liquids or soft pasty materials. Frequently, a polymerization inhibitor is incorporated in the polymerizable materials prior to blending, since polymerization of these materials will sometimes occur at room temperature within a comparatively short time and premature polymerization would result in the absence of these inhibitors.

These inhibitors are not necessarily separated out prior to blending. Inhibitors, such as phenyl-beta-naphthylamine, hydroquinone, tert-butyl catechol, resorcinol, and the like, are suitable. These inhibitors are employed in small amounts, generally less than 1 percent by weight, based on the total monomer composition and frequently between 0.01 and 0.2 weight percent is considered sufficient.

The effect of the inhibitor carried over into the blend can be overcome by the addition of a catalyst and a promoter. Promoters include materials, such as metal salts, e.g., cobalt, iron, manganese, or lead, in the form of naphthenates or other salts. Other promoters are amine-type compounds, such as ethanolamine, diethanolamine, triethanolamine, dialkylenetriamine, tributylamine, and the like.

Catalysts employed are generally of the peroxide type, such as benzoyl peroxide, tert-butyl perbenzoate, tert-butyl hydroperoxide, cumene hydroperoxide, cyclohexanone peroxide, etc. The catalyst is generally added to the composition just prior to the processing step, such as molding, casting, etc.

The amount of catalyst employed is such that the composition will remain fluid for the length of time required for the processing step. Whatever catalyst is chosen, the amount used is that which will give the desired gel time. Those skilled in the art will be familiar with such methods. Gel time will, of course, depend upon the condition under which the composition is used. The composition should remain fluid for a time sufficient to form the article and this may be different say for a laminate than it would be for a molded article. In general, the amount of catalyst is regulated to give a gel time in the range of 1 and 30 minutes.

One convenient method for preparing laminates is as follows: the liquid polymer/ester blend is divided into aliquots and a first portion spread onto a plate, this is followed by a filler material such as a glass fabric, a second portion of blend, a second portion of filler, etc., until the required number of plies are laid, a top plate is put into place and adjusted so as to form a laminate of the desired thickness. I have found that better wetting of the fabric is obtained if the assembled laminate in the mold is allowed to stand at room temperature several hours, generally 2–3 hours, before curing. After standing the desired time, the laminate is heated to the desired curing temperature where it is held until the desired degree of cure is obtained.

Curing is generally effected at temperatures in the range between 150 and 280° C., but, when catalysts are present, lower temperatures can be used if desired. The curing temperature must be below that which will cause decomposition of the resin.

Curing time is dependent upon the temperature and the presence or absence of a catalyst. Other things being equal, the curing time required will become shorter as the temperature is increased. In general, the time will be in the range between 2 and 50 hours but a longer period can be used where required.

In addition to their use in the production of castings and laminates, the liquid polymer/ester blends herein described may be compounded with inorganic fillers such as asbestos, clay, chopped Fiberglas, diatomaceous earth, silica, and mica, in amounts ranging from 25 to 75 percent by weight of the liquid polymer/ester blend, to give molding compositions of the thermosetting type.

I will further illustrate my invention by the following examples. As has been indicated, liquid polybutadiene, a polymer of 1,3-butadiene, has been widely used in commerce and is a preferred liquid polymer of my invention, and for that reason, I have used this liquid polymer to illustrate the advantages of the composition of this invention. Those skilled in the art will see many modifications which can be made without departing from the scope of this invention. It is obvious that fabric or fillers other than glass fabric can be used in the preparation of laminates. Finely divided filler can be used in coating resins, etc., all of which is known in the art. The figures are presented to show graphically the effect of the ester.

The attached drawings illustrate the effect of the ester on the cure.

Figure 1:
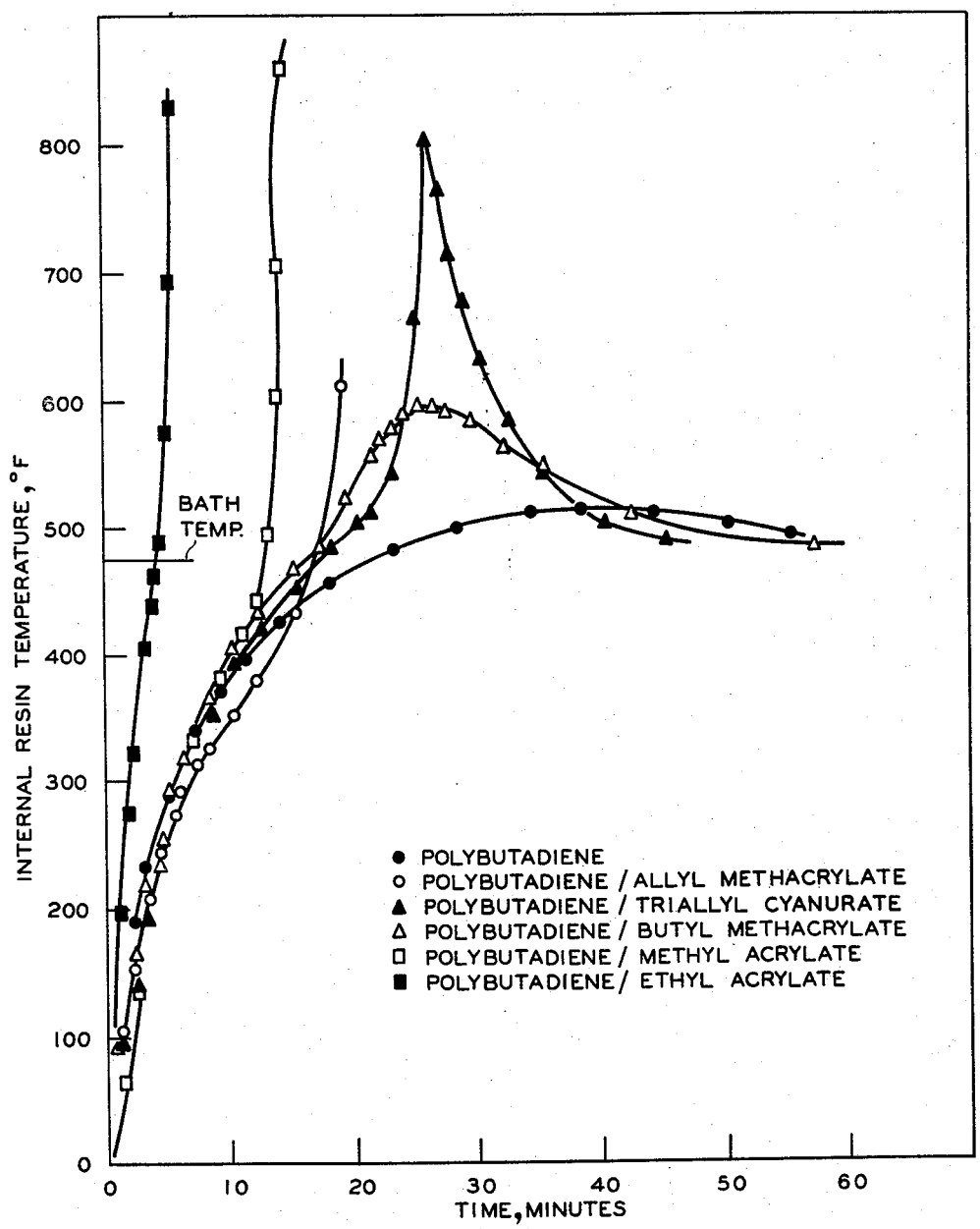
Figure 1 is a plot of resin temperature against time comparing the curing action of liquid polybutadiene alone and mixed with esters of this invention.

The data used in the above figures are obtained from the following examples which are illustrative of the advantages of this invention. It will be understood by those skilled in the art that any of the examples as disclosed are applicable when used as taught by the specification.

*Example I*

Liquid polybutadiene, prepared by mass polymerization using finely divided sodium as the catalyst, having a viscosity of 1362 Saybolt Furol seconds at 100° F. and a Gardner color of 11, was stripped in a batch operation by vigorous flushing of nitrogen through the polymer. For this operation, the polymer was charged to a pot which was evacuated to 10 mm. Hg and flushed with nitrogen over a one-hour period. The polymer was heated in an oil bath to a temperature of 200–370° F. for the first 30 minutes and then to 370–380° F. for an additional 30 minutes. The pressure was maintained at 10 mm. Hg throughout the operation.

A mixture of the stripped liquid polybutadiene with 20 percent by weight of ethyl acrylate was prepared. The liquid polymer blended readily with the ethyl acrylate by stirring. Approximately 20 milliliters of the mixture was placed in a tube and heated at 212° F. until gelation occurred. The tube was then placed in a bath regulated at 360° F. and the Shore D hardness determined at various intervals. A similar run was made using liquid polybutadiene alone. Preliminary heating at 212° F. did not produce gelation with this sample. The following results were obtained:

| Curing Time, Hours @ 360° F. | Shore D Hardness ||
|---|---|---|
| | 80/20 Polybutadiene/ Ethyl Acrylate | Polybutadiene |
| 19 | 3 | 0 |
| 25 | 4 | 0 |
| 87 | 7 | 1 |
| 109 | 8 | 3 |
| 130 | 9 | 4 |
| 151 | 10 | 5 |
| 172 | 12 | 5.5 |
| 242 | 15 | 6 |
| 266 | 18 | 6.5 |
| 361 | 25 | 7 |
| 479 | 50 | 13 |
| 573 | 53 | 20 |

*Example II*

A sample of liquid polybutadiene, prepared by mass polymerization using finely divided sodium as the catalyst, having a viscosity of about 1360 Saybolt Furol seconds at 100° F. and a Gardner color of 11, was stripped with steam at atmospheric pressure in a batch operation over a 4.5-hour period. Steam stripping was started at a pot temperature of 340° F. and the temperature was raised gradually to 390° F. over a period of 2 hours. The remainder of the stripping was effected at 390° F. Some bodying occurred during stripping and the product which remained was much more viscous than the starting material. This stripped polymer was blended with styrene, with ethyl acrylate, and with triallyl cyanurate, in the ratio of 80 parts by weight of the polymer to 20 parts by weight of the monomeric material and the blends were used in the preparation of Fiberglas cloth laminates. Similar laminates were prepared using the stripped polybutadiene alone. Two different types of the laminates were prepared from Owens-Corning Fiberglas cloth (ECC–181–114), one containing 12 plies and having a thickness of ⅛ inch, and the other containing 45 plies and having a thickness of ½ inch.

In the preparation of the laminates, attention was given to the orientation of the cloth. The cloth had a breaking strength of 340 pounds per lineal inch in the direction of the fill threads and 330 pounds per lineal inch in the direction of the warp threads. All laminates were laid up with the fill threads parallel. By virtue of its weave, several types of close-packing or nesting of the Fiberglas cloth were possible. Each thread of the cloth went under (or over) one and over (or under) three threads. Consequently, on one surface were seen long stitches or shafts parallel to the fill threads, while on the other surface, the shafts paralleled the warp threads. In preparing a laminate, the panels of Fiberglas cloth were assembled so that the shafts on the surface of one panel paralleled and nested snugly with the shafts on the adjacent surface of the next panel. All laminates were laid up with the panels nested and the fill threads parallel.

The requisite number of plies of Fiberglas cloth oriented as indicated were assembled between stiff wire screens in a vacuum impregnator. The impregnator and resin flask were evacuated and heated to dry the Fiberglas cloth and remove dissolved gases from the resin. The resin flask was connected to the impregnator, nitrogen was bled into the flask, and resin was permitted to rise through the Fiberglas cloth.

After standing for several hours to insure good wetting, the impregnated pack of Fiberglas cloth was removed, smoothed with a spatula, and placed between aluminum foil in a flat, stainless steel mold. The aluminum foil adhered to the laminate thus preventing exposure to air at cure temperatures. In order to provide a laminate of definite thickness, the upper and lower plates of the mold were bolted together while being separated by spacers.

The ⅛ inch thick laminate pressed in a mold was placed in a pan and heated at 260° C. in a vented oven for a period long enough to insure a hard, strong laminate of less than optimum strength. The laminate was removed from the mold and cut into flexural strength bars. The bars were heated at 260° C. under nitrogen for various lengths of time and their flexural strengths determined to fix the optimum cure time. In a similar manner the ½ inch laminate was made and given the cure conferring optimum strength. From this second laminate, impact strength and bonding strength were determined.

The high temperature resistance of the laminates was determined by using flexural bar specimens. A vertical furnace was regulated at 371° C. (700° F.) and a rack was provided for holding the test specimens. Bars were lowered into the furnace and heated for four minutes after which flexural strength was determined.

Results of the various tests were as follows:

| | Resin From— | | | |
|---|---|---|---|---|
| | 80/20 Liquid Polybutadiene/ Ethyl Acrylate | 80/20 Liquid Polybutadiene/ Triallyl Cyanurate | 80/20 Liquid Polybutadiene/ Styrene | Liquid Polybutadiene |
| Optimum cure, hrs. at 500° F. | 3 | 5 | 11 | 11 |
| Optimum flexural strength, p.s.i. | 30,300 | 29,100 | 25,400 | 29,000 |
| Bonding strength, p.s.i. | 1296 | | 1383 | 1167 |
| Impact strength, ft. lbs./in.[1] | 24.9 | | 26.3 | 25.33 |
| Percent strength retention after heating at 371° C. (700° F.) 4 min. | 85.2 | | 74.3 | 64.4 |

[1] ASTM D 256–47T, cantilever beam test (Izod type).

These data demonstrate that a much shorter time was required for optimum cure with the liquid polybutadiene/ ethyl acrylate and liquid polybutadiene triallyl cyanurate compositions than with the liquid polybutadiene/styrene composition or the liquid polybutadiene alone.

*Example III*

Liquid polybutadiene, prepared by mass polymerization using finely divided sodium as the catalyst, having a viscosity of about 1360 Saybolt Furol seconds at 100° F. and a Gardner color of 11, was blended with 25 percent by weight of each of the following monomers: allyl methacrylate, triallyl cyanurate, butyl methacrylate, methyl acrylate, ethyl acrylate, ethyl itaconate, diallyl sebacate, diallyl phthalate, vinyl acetate, butyl maleate, and allyl acetate. 20 milliliters of each blend was placed in a 25 mm. O.D. tube provided with a 4 mm. O.D. thermocouple well inserted to within 20 mm. of one end. Degassing was accomplished by warming the tube, which was evacuated to a pressure of a few mm. Hg, in hot water. The tube was sealed and then immersed, except for the thermocouple well, in a bath controlled at 476° F. Internal resin temperatures at various time intervals are shown below for each of the resins. A control was run using liquid polybutadiene alone. In this instance it was not necessary that the tube be sealed. It was immersed to three-fourths of its length in the 476° F. bath.

Resins in the table are numbered in the following manner:

(1) Liquid polybutadiene
(2) Liquid polybutadiene/allyl methacrylate
(3) Liquid polybutadiene/triallyl cyanurate
(4) Liquid polybutadiene/butyl methacrylate
(5) Liquid polybutadiene/methyl acrylate
(6) Liquid polybutadiene/ethyl acrylate
(7) Liquid polybutadiene/ethyl itaconate
(8) Liquid polybutadiene/diallyl sebacate
(9) Liquid polybutadiene/diallyl phthalate
(10) Liquid polybutadiene/vinyl acetate
(11) Liquid polybutadiene/butyl maleate
(12) Liquid polybutadiene/allyl acetate

| Time, Minutes | Internal Resin Temperature, F. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 1 | | 103 | 95 | 98 | 65 | 200 | 164 | 83 | 83 | 104 | 83 | |
| 1.5 | | | | | | 275 | | | | | | |
| 2 | 190 | 153 | 144 | 168 | 137 | 326 | 228 | 94 | 120 | 168 | | 162 |
| 3 | 224 | 207 | 196 | 218 | | 405 | 270 | 120 | 174 | 214 | | |
| 3.25 | | | | | | 437 | | | | | 214 | |
| 3.5 | | | | | | | | | | | | |
| 4 | | 245 | 238 | 255 | 233 | 460 | 310 | 145 | 222 | 255 | | 248 |
| 4.5 | | | | | | 488 | | | | | | |
| 5 | 290 | 272 | 278 | 293 | | 578 | 344 | 167 | 256 | 288 | | |
| 5.25 | | | | | | 698 | | | | | | |
| 5.5 | | | | | | 832 | | | | | | |
| 6 | | 294 | 304 | 320 | 303 | (¹) | 371 | 193 | 286 | 320 | | 312 |
| 7 | 337 | 311 | | | 333 | | 391 | 255 | 315 | 342 | | |
| 8 | | 325 | 358 | 366 | 358 | | 415 | 302 | 338 | 365 | | 357 |
| 9 | 371 | | | | 380 | | 432 | 331 | 364 | 382 | | |
| 10 | | 355 | 396 | 405 | 406 | | 448 | 357 | 378 | 398 | | 391 |
| 11 | 399 | | | | 416 | | | 373 | | | 394 | |
| 12 | | 380 | 423 | 436 | 441 | | 470 | 390 | 407 | 423 | | 418 |
| 13 | | | | | 497 | | | 405 | | | 428 | |
| 13.5 | | | | | 603 | | | | | | | |
| 13.75 | | | | | 708 | | | | | | | |
| 14 | 430 | | | | 860 | | 488 | 422 | 428 | | | 436 |
| 14.25 | | | | | (¹) | | | | | | | |
| 14.5 | | | | | | | | | | | | |
| 15 | | 432 | 455 | 468 | | | | 433 | | 450 | 450 | |
| 16 | | | | | | | | 442 | 442 | | | 447 |
| 16.25 | | | | | | | 507 | | | | | |
| 17 | | | | 488 | | | | | | | | |
| 18 | 459 | | 485 | | | | 515 | 452 | 454 | 467 | | |
| 19 | | 610 | | 522 | | | | | | | 475 | 463 |
| 20 | | (¹) | 503 | | | | 515 | | 464 | | | |
| 21 | | | 512 | 556 | | | | 470 | | | 491 | |
| 22 | | | | 570 | | | | | | 483 | | (²) |
| 23 | 480 | | 545 | 582 | | | 512 | | 475 | | 503 | |
| 24 | | | | 589 | | | | 480 | | | | |
| 24.5 | | | | 665 | | | | | | | | |
| 25 | | | | 592 | | | 510 | 487 | 482 | | 516 | |
| 25.5 | | | | 805 | | | | | | | | |
| 26 | | | | 593 | | | | | | | | |
| 26.5 | | | | 765 | | | | | | | | |
| 27 | | | | 591 | | | | | 493 | 503 | | |
| 27.5 | | | | 717 | | | | | | | | |
| 28 | 500 | | | 678 | | | | | | | 529 | |
| 28.5 | | | | | | | | | | | | |
| 29 | | | | 582 | | | | | | 486 | | |
| 30 | | | | 634 | | | | | 499 | | | |
| 31 | | | | | | | 505 | | | | 530 | |
| 32 | | | | 583 | 562 | | | | | | | |
| 33 | | | | | | | | | | 503 | 530 | |
| 34 | 511 | | | | | | | | | 489 | 516 | |
| 35 | | | | 540 | 543 | | | | | | | |
| 36 | | | | | | | | | | 503 | 525 | |
| 38 | 513 | | | | | | | | | | 516 | |
| 39 | | | | | | | | | | | 516 | |
| 40 | | | | 504 | | | | | | | | |
| 41 | | | | | | | | | | 489 | | |
| 42 | | | | | 510 | | | | 499 | | | |
| 43 | | | | | | | | | | | 511 | 507 |
| 44 | 509 | | | | | | | | | | | |
| 45 | | | | 490 | | | | | 497 | | | |
| 48 | | | | | | | | | | | 499 | |
| 50 | 501 | | | | | | | | | | | |
| 51 | | | | | | | | | | 500 | | |
| 53 | | | | | | | | | 480 | | | |
| 55 | 495 | | | | | | | | | | 490 | |
| 56 | | | | | | | | | | | | |
| 57 | | | | | 485 | | | | | | | |
| 59 | | | | | | | | | | 490 | | |
| 64 | | | | | | | | | | | 483 | |
| 67 | | | | | | | | | 473 | | | |
| 77 | | | | | | | | | | | 481 | |

¹ Reaction went out of control.
² No significant temperature increase over liquid polybutadiene alone. Volatility of the monomer caused the tube to break.

Figure 2:
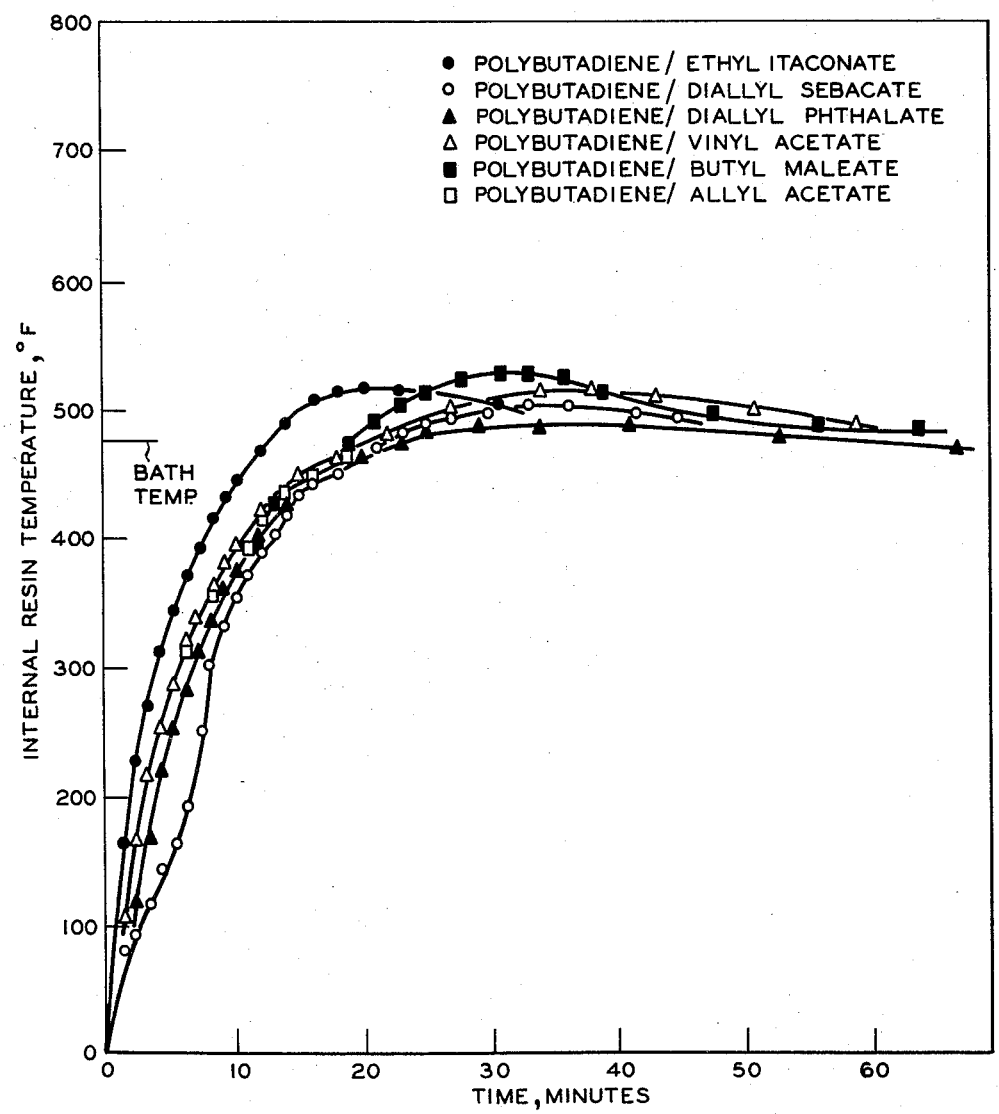
Figure 2 is a plot of internal resin temperature against time wherein other esters blended with the liquid polybutadiene are involved.

The difference between the compositions prepared from liquid polybutadiene and allyl methacrylate, triallyl cyanurate, butyl methacrylate, methyl acrylate, and ethyl acrylate, and the liquid polybutadiene is more clearly shown by reference to Figure 1. The remaining compositions, shown in Figure 2, are similar to liquid polybutadiene. Hard resins are obtained by heating the compositions prepared from liquid polybutadiene with ethyl acrylate, methyl acrylate, butyl methacrylate, allyl methacrylate, and triallyl cyanurate. Resins from liquid polybutadiene alone and from liquid polybutadiene with the other esters tried varied from sticky to soft, rubbery materials and the products had pronounced odors.

*Example IV*

The effect of tert-butyl perbenzoate on the rate of cure of the 80/20 liquid polybutadiene/ethyl acrylate composition described in Example I and also on liquid polybutadiene alone was tried. Three parts by weight of tert-butyl perbenzoate was used per 100 parts of the resin. The curing procedure described in Example I was followed using a bath temperature of 360° F. Shore D hardness was determined at various intervals. Results were as follows:

| Curing Time, Hours | Shore D Hardness | |
|---|---|---|
| | 80/20 Polybutadiene/ Ethyl Acrylate | Polybutadiene |
| 19 | 25 | 5 |
| 25 | 28 | 7 |
| 87 | 45 | 10 |
| 109 | 48 | 11 |
| 130 | 55 | 12 |
| 151 | 58 | 15 |
| 172 | 62 | 20 |
| 242 | 68 | 30 |
| 266 | 70 | 35 |
| 361 | 75 | 40 |
| 479 | 80 | 58 |
| 573 | 80 | 65 |

I claim:

1. A thermosetting composition comprising at least 60 parts by weight of a liquid polymer of a conjugated diene of 4 to 6 carbon atoms and at least 10 parts by weight of an ester selected from the group consisting of esters having the formula:

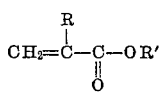

and

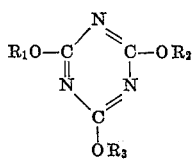

wherein R is selected from the group consisting of methyl and hydrogen, R', $R_2$ and $R_3$ are selected from the group consisting of alkyl radicals of 1 to 5 carbon atoms and alkenyl radicals of 2 to 10 carbon atoms and $R_1$ is an alkenyl radical of 2 to 10 carbon atoms, said parts by weight being based on 100 parts by weight of polymer plus ester.

2. A thermosetting composition comprising a liquid polymer of a conjugated diene of 4 to 6 carbon atoms having a Saybolt Furol viscosity at 100° F. in the range of 100 to 6,000 and an ester comprising 10 to 40 parts by weight per 100 parts esters plus liquid polymer, the said ester being selected from the group consisting of esters having the formula:

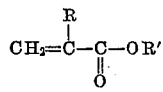

and

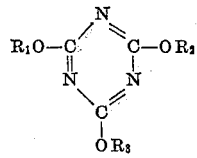

wherein R is selected from the group consisting of methyl and hydrogen, R', $R_2$ and $R_3$ are selected from the group consisting of alkyl radicals of 1 to 5 carbon atoms and alkenyl radicals of 2 to 10 carbon atoms and $R_1$ is an alkenyl radical of 2 to 10 carbon atoms.

3. A thermosetting composition particularly suited for preparation of plastics of high flexural strength comprising (A) a liquid polymer prepared by polymerizing monomeric materials comprising at least 50 weight percent of a conjugated diene of 4 to 6 carbon atoms and the remainder being a copolymerizable monomer selected from the group consisting of styrene and alkyl substituted styrenes and (B) 10 to 40 weight parts of an ester per 100 parts ester plus liquid polymer, said ester being selected from the group consisting of esters having the formula:

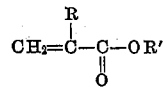

and

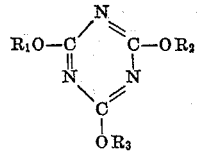

wherein R is selected from the group consisting of methyl and hydrogen, R', $R_2$ and $R_3$ are selected from the group consisting of alkyl radicals of 1 to 5 carbon atoms and alkenyl radicals of 2 to 10 carbon atoms and $R_1$ is an alkenyl radical of 2 to 10 carbon atoms.

4. The composition of claim 3 wherein the liquid polymer is prepared by sodium polymerization and has a Saybolt Furol viscosity at 100° F. in the range of 100 to 6,000 and a molecular weight in the range of 300 to 3,000.

5. The composition of claim 4 wherein the liquid polymer is liquid polybutadiene and the ester is allyl methacrylate.

6. The composition of claim 4 wherein the liquid polymer is liquid polybutadiene and the ester is triallyl cyanurate.

7. The composition of claim 4 wherein the liquid polymer is liquid polybutadiene and the ester is butyl methacrylate.

8. The composition of claim 4 wherein the liquid polymer is liquid polybutadiene and the ester is methyl acrylate.

9. The composition of claim 4 wherein the liquid polymer is liquid polybutadiene and the ester is ethyl acrylate.

10. A thermoset resin comprising the thermoset product of (A) a liquid polymer prepared by polymerizing monomeric materials comprising at least 50 weight percent of a conjugated diene of 4 to 6 carbon atoms and the remainder being a copolymerizable monomer selected from the group consisting of styrene and alkyl substituted styrenes and (B) 10 to 40 weight parts of an ester per 100 parts ester plus liquid polymer, said ester being selected from the group consisting of esters having the formula:

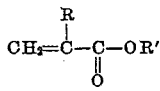

and

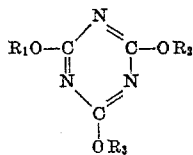

wherein R is selected from the group consisting of methyl and hydrogen, R', $R_2$ and $R_3$ are selected from the group consisting of alkyl radicals of 1 to 5 carbon atoms and alkenyl radicals of 2 to 10 carbon atoms and $R_1$ is an alkenyl radical of 2 to 10 carbon atoms.

11. A laminate comprising a plurality of plies bonded together by the thermoset product of (A) a liquid polymer prepared by polymerizing monomeric materials comprising at least 50 weight percent of a conjugated diene of 4 to 6 carbon atoms and the remainder being a copolymerizable monomer selected from the group consisting of styrene and alkyl substituted styrenes and (B) 10 to 40 weight parts of an ester per 100 parts esters plus liquid polymer, said ester being selected from the group consisting of esters having the formula:

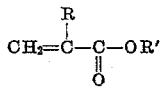

and

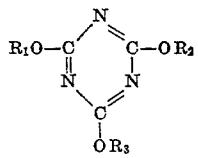

wherein R is selected from the group consisting of methyl and hydrogen, R', $R_2$ and $R_3$ are selected from the group consisting of alkyl radicals of 1 to 5 carbon atoms and alkenyl radicals of 2 to 10 carbon atoms and $R_1$ is an alkenyl radical of 2 to 10 carbon atoms.

12. A method of preparing a thermoset polymeric composition of high flexural strength which comprises blending (A) a liquid polymer prepared by polymerizing monomeric materials comprising at least 50 weight percent of a conjugated diene of 4 to 6 carbon atoms and the remainder being a copolymerizable monomer selected from the group consisting of styrene and alkyl substituted styrenes and (B) 10 to 40 weight parts of an ester per 100 parts ester plus liquid polymer, said ester being selected from the group consisting of esters having the formula:

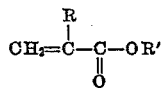

and

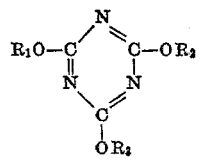

wherein R is selected from the group consisting of methyl and hydrogen, R', $R_2$ and $R_3$ are selected from the group consisting of alkyl radicals of 1 to 5 carbon atoms and alkenyl radicals of 2 to 10 carbon atoms and $R_1$ is an alkenyl radical of 2 to 10 carbon atoms, forming the resulting blend, and curing the formed blend.

13. A method of preparing a cast thermoset polymeric article of high flexural strength which comprises blending (A) a liquid polymer prepared by polymerizing monomeric materials comprising at least 50 weight parts per 100 parts total monomers of a conjugated diene of 4 to 6 carbon atoms and the remainder being a copolymerizable monomer selected from the group consisting of styrene and alkyl substituted styrenes, said liquid polymer having a Saybolt Furol viscosity at 100° F. in the range of 100 to 6,000 and a molecular weight in the range of 300 to 3,000 and (B) 10 to 40 weight parts of an ester per 100 parts ester plus liquid polymer, said ester being selected from the group consisting of esters having the formula:

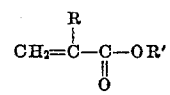

and

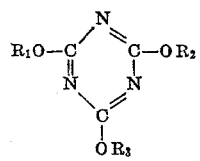

wherein R is selected from the group consisting of methyl and hydrogen, R', $R_2$ and $R_3$ are selected from the group consisting of alkyl radicals of 1 to 5 carbon atoms and alkenyl radicals of 2 to 10 carbon atoms and $R_1$ is an alkenyl radical of 2 to 10 carbon atoms forming the resulting blend, and subjecting said blend to a curing temperature in the range of 150 and 280° C.

14. A method of preparing a thermoset polymeric article of high flexural strength which comprises blending (A) a liquid polymer prepared by polymerizing monomeric materials comprising at least 50 weight parts per 100 parts total monomers of a conjugated diene of 4 to 6 carbon atoms and the remainder being a copolymerizable monomer selected from the group consisting of styrene and alkyl substituted styrenes, said liquid polymer having a Saybolt Furol viscosity at 100° F. in the range of 100 to 6,000 and a molecular weight in the range of 300 to 3,000 and (B) 10 to 40 weight parts of an ester per 100 parts ester plus liquid polymer, said ester being selected from the group consisting of esters having the formula:

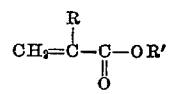

and

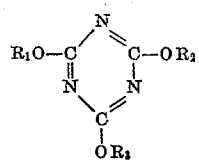

wherein R is selected from the group consisting of methyl and hydrogen, R', $R_2$ and $R_3$ are selected from the group consisting of alkyl radicals of 1 to 5 carbon atoms and alkenyl radicals of 2 to 10 carbon atoms and $R_1$ is an alkenyl radical of 2 to 10 carbon atoms, incorporating a peroxide catalyst as the last ingredient in said blend, forming said blend, and curing said blend at a temperature in the range 150 to 280° C.

15. A method of preparing a thermoset laminate of high flexural strength which comprises blending (A) a liquid polymer prepared by polymerizing monomeric materials comprising at least 50 weight parts per 100 parts total monomeric of a conjugated diene of 4 to 6 carbon atoms and the remainder being a copolymerizable monomer selected from the group consisting of styrene and alkyl substituted styrenes, said liquid polymer having a Saybolt Furol viscosity at 100° F. in the range of 100 to 6,000 and a molecular weight in the range of 300 to 3,000 and (B) 10 to 40 weight parts of an ester per 100 parts ester plus liquid polymer, said ester being selected from the group consisting of esters having the formula:

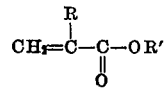

and

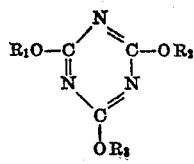

wherein R is selected from the group consisting of methyl and hydrogen, R', $R_2$ and $R_3$ are selected from the group consisting of alkyl radicals of 1 to 5 carbon atoms and alkenyl radicals of 2 to 10 carbon atoms and $R_1$ is an alkenyl radical of 2 to 10 carbon atoms coating a plurality of fabric sheets with the blend forming a plurality of plies of the resulting coated sheets, and subjecting the formed plies to a temperature in the range of 150 to 280° C.

References Cited in the file of this patent

UNITED STATES PATENTS

| | | |
|---|---|---|
| 2,161,038 | Habgood | June 6, 1939 |
| 2,433,965 | Upson | Jan. 6, 1948 |
| 2,603,655 | Strain | July 15, 1952 |
| 2,631,175 | Crouch | Mar. 10, 1953 |
| 2,688,009 | Crouch | Aug. 31, 1954 |
| 2,707,177 | Skiff et al. | Apr. 26, 1955 |
| 2,753,385 | Gleason | July 3, 1956 |

FOREIGN PATENTS

| | | |
|---|---|---|
| 469,976 | Great Britain | Aug. 6, 1937 |